United States Patent [19]

Igawa

[11] Patent Number: 5,299,827
[45] Date of Patent: Apr. 5, 1994

[54] AIR BAG SYSTEM WITH A JOINING STRUCTURE BETWEEN A CASING AND A DOOR

[75] Inventor: Tadahiro Igawa, Shiga, Japan
[73] Assignee: Takata Corporation, Tokyo, Japan
[21] Appl. No.: 5,052
[22] Filed: Jan. 15, 1993
[30] Foreign Application Priority Data
   Jan. 31, 1992 [JP] Japan .................. 4-16358
[51] Int. Cl.[5] .................. B60R 21/16
[52] U.S. Cl. .................. 280/732; 280/743 R
[58] Field of Search .......... 280/728, 731, 732, 743

[56] References Cited

U.S. PATENT DOCUMENTS

| | | | |
|---|---|---|---|
| 4,842,299 | 6/1989 | Okamura et al. | 280/732 |
| 5,060,972 | 10/1991 | Satoh et al. | 280/732 |
| 5,150,919 | 9/1992 | Sakakida et al. | 280/732 |
| 5,199,739 | 4/1993 | Fujiwara et al. | 280/732 |

Primary Examiner—Joseph D. Pape
Attorney, Agent, or Firm—Kanesaka and Takeuchi

[57] ABSTRACT

A jointing structure between a casing and a door in a passenger's air bag system, comprises a casing having an opening at a front face thereof opened toward a cabin of a vehicle, a door covering the opening and having one of opposed sides connected with the casing in vicinity to the opening so that the other side of the door can turn out in its opening direction, a breakable jointing member jointing the other side of the door to the casing with respect to the other of the opposed sides of the opening and capable of being broken to disconnect the casing and the door, and a projection formed on a back of the door in vicinity of the breakable jointing member, being located closer to a center of the back of the door than the breakable jointing member, having a smooth outer face projecting higher than a portion at which the breakable jointing member is broken when an air bag is extended.

9 Claims, 6 Drawing Sheets

AIR BAG SYSTEM WITH A JOINING STRUCTURE BETWEEN A CASING AND A DOOR

BACKGROUND OF THE INVENTION

1. Field of the Invention

The present invention relates to an air bag system for extending an air bag at the time of a collision of a vehicle to protect a passenger and, more particularly, to a jointing structure between a casing and a door of the air bag system.

2. Description of the Related Art

In a passenger's air bag system, there are attached to a casing (which may also be called a "container") not only an air bag and an inflater but also a door covering an opening of the casing. The door may also be called a "cover door" or a "deployment door". At the time of a collision of a vehicle, the inflater is energized to extend the air bag so that the door is opened into the cabin by the air bag being extended until the air bag is fully extended into the cabin.

The schematic construction and operation of a passenger's air bag system of the prior art will be described with reference to FIGS. 8 to 11.

FIG. 8 is a schematic section showing the passenger's air bag system of the prior art, and FIG. 9 is a section taken along line IX—IX of FIG. 8. This passenger's air bag system 10 contains an air bag 14 in a folded state in a casing 12. In the casing 12, there is disposed an inflater 16 for extending the air bag 14. The casing 12 has an opening at a front side thereof (or its upper side, as seen from FIG. 8) which is opened toward a vehicle cabin. The opening is covered with a door 18, which is constructed by mounting a metallic back plate 18b on the back of a door body 18a made of a synthetic resin. A reinforcing member such as mesh is inserted, if necessary, into the door body 18a.

The back plate 18b has its one side raised generally vertically of the door 18 to form a leg portion 20, which is fixed on the casing 12 by means of bolts 22. Incidentally, these bolts 22 may be replaced by other fixtures such as rivets. By these bolts or rivets, the air bag 14 is fixed together with the leg portion 20 in the casing 12.

In the back plate 18b at the opposite side of the leg portion 20, there is fixed a joint 24, through which the door 18 is jointed to the casing 12. Designated at numeral 26 are bolts (although may be replaced by rivets) for fixing the joint 24 on the casing 12. These bolts 28 fix the air bag 14 in the casing 12.

The joint 24 is formed with a neck portion 28, at which the joint 24 is broken, when the door 18 is opened by operating the air bag system, to allow the door 18 to turn in its opening direction.

If the vehicle carrying the passenger's air bag system thus constructed meets an emergency such as a collision, the inflater 16 discharges gases to extend the air bag 14 abruptly. At this time, the air bag 14 pushes the door 18 so that the neck portion 28 is broken at first, as shown in FIG. 10. Then, the door 18 is turned in the opening direction about its leg portion 20, as indicated by arrow A in FIG. 11. Thus, the air bag 14 is fully extended into the cabin, as indicated by arrow B.

The passenger's air bag system of the prior art has its neck portion 28 broken, after the air bag system is energized, and a residual portion 30 is produced on the door 18. The portion 30 protrudes considerably from the inner face of the door 18. The air bag 14 makes contact with the residual portion 30 when the bag is extending into the cabin. The residual portion 30 has its leading end portions so sharply corrugated that it will damage the air bag 14. Thus, the air bag 14 is required to be fabricated with a strong and tough cloth for eliminating any risk of being broken even if the air bag 14 slides on the residual portion 30. The strong and tough cloth raises a prime cost of the air bag 14.

OBJECT AND SUMMARY OF THE INVENTION

An object of the present invention is to prevent an air bag from being damaged by a tip of a residual portion of a joint jointing a casing and a door thereof.

According to a first aspect of the present invention, there is provided a jointing structure between a casing and a door in a passenger's air bag system. The casing has an opening at a front face thereof opened toward a cabin of a vehicle, and the door covers the opening and has one of opposed sides connected with the casing in vicinity to the opening so that the other side of the door can turn out in its opening direction. The structure includes a breakable joint jointing the other side of the door to the casing capable of being broken to disconnect the casing and the door, and a projection formed on a back of the door in vicinity of the breakable joint, the projection being located closer to a center of the back of the door than the breakable joint, and having a smooth outer face projecting higher than a portion at which the breakable joint member is broken when an air bag is extended.

According to a second aspect of the present invention, there is provided a jointing structure between a casing and a door in a passenger's air bag system. The casing has an opening at a front face thereof opened toward a cabin of a vehicle, and the door covers the opening and has one of opposed sides connected with the casing in vicinity to the opening so that the other side of the door can turn out in its opening direction. The jointing structure includes a breakable joint jointing the other side of the door to the casing capable of being broken to disconnect the casing and the door, and a recess formed in a back of the door and arranged therein with a breakable portion of the breakable joint, the breakable portion being broken when the door is opened on extention of an air bag of the air bag system.

When the passenger's air bag system is operated so that the jointing structure of the first aspect has its breakable member broken, the joint has its leading end portion retracted from a top of the projection. Since the projection has the smooth outer face, the air bag is extended into the cabin, while smoothly sliding on the projection but not contacting with the residual portion. Accordingly, the air bag is prevented from being damaged by the residual portion.

According to the jointing structure of the second aspect, the breakable member has the residual portion retracted into the recess so that the air bag can also be extended smoothly without any damage, when the air bag is extended into the cabin.

DESCRIPTION OF THE PREFERRED EMBODIMENTS

A first embodiment of the present invention will be described in the following with reference to FIGS. 1 to 4.

The air bag system 10' includes a joint 24' thereof with a projection 32 having a smooth outer face. The projection 32 is arranged closer to a center of a door 18' than a neck portion 28' of the joint 24'. Incidentally, the projection 32 of the present embodiment is extended in a semicircular shape as to enclose the side of the neck portion 28'. A top face of the projection 32 is rounded.

The other construction is similar to that of the prior art, and the common portions are designated at dashed identical numerals so as to omit their description.

Figure 3:
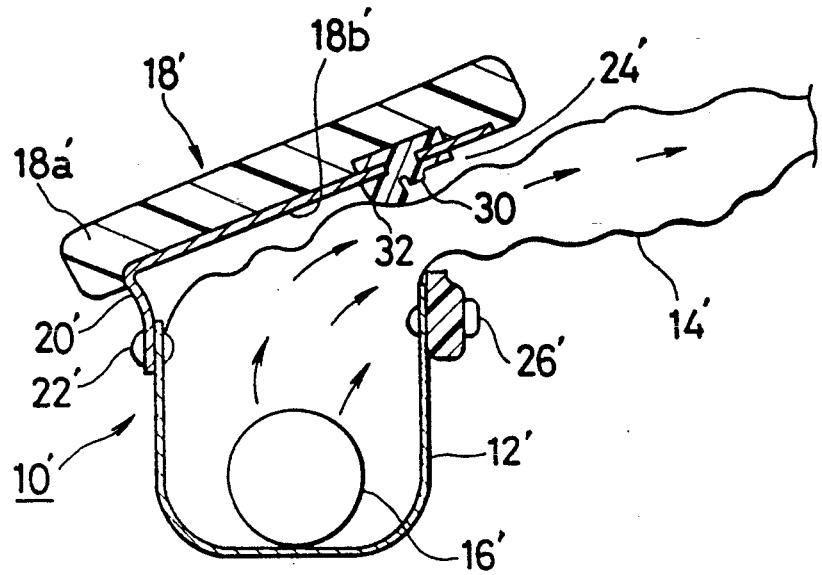
FIG. 3 is a section for explaining the operation of an air bag system having the structure of the embodiment.
Figure 4:
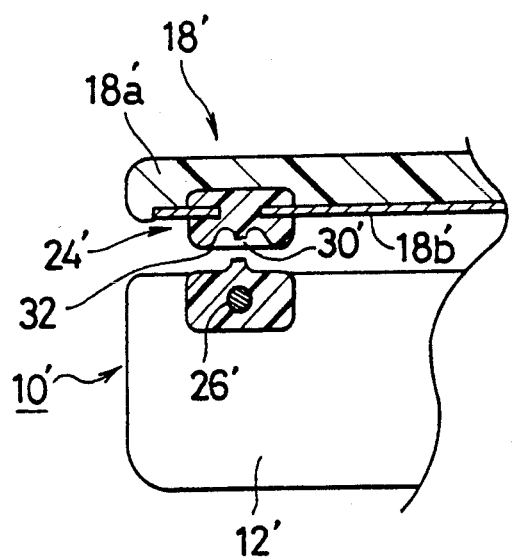
FIG. 4 is a section showing a broken state of the structure of the embodiment.

When the passenger's air bag system having the jointing structure thus constructed is operated, the neck portion 28' is broken at first, as shown in FIG. 4. After this, the door 18 is turned, as shown in FIG. 3, in an opening direction so that an air bag 14' is extended into a cabin. Since a residual portion 30' is retracted from the projection 32, the air bag 14' is kept away from contact with the residual portion 30' so that the bag 14 is prevented from being damaged by the portion 30'. Moreover, since the projection 32 has its outer face smoothed, the air bag 14' is allowed to extend into the cabin while smoothly sliding on the projection 32.

Figure 5:
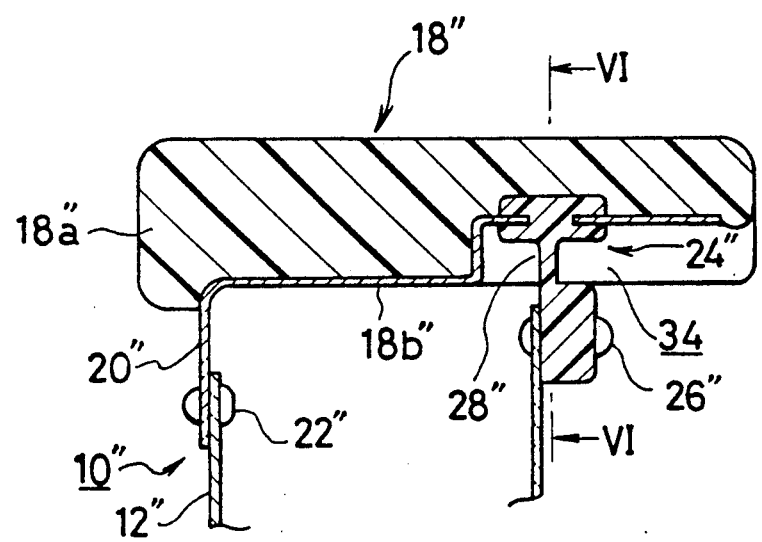
FIG. 5 is a section showing another embodiment of the present invention.
Figure 6:
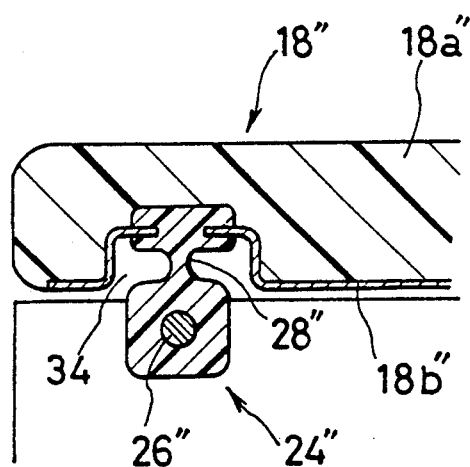
FIG. 6 is a section taken along line VI—VI of FIG. 5.
Figure 7:
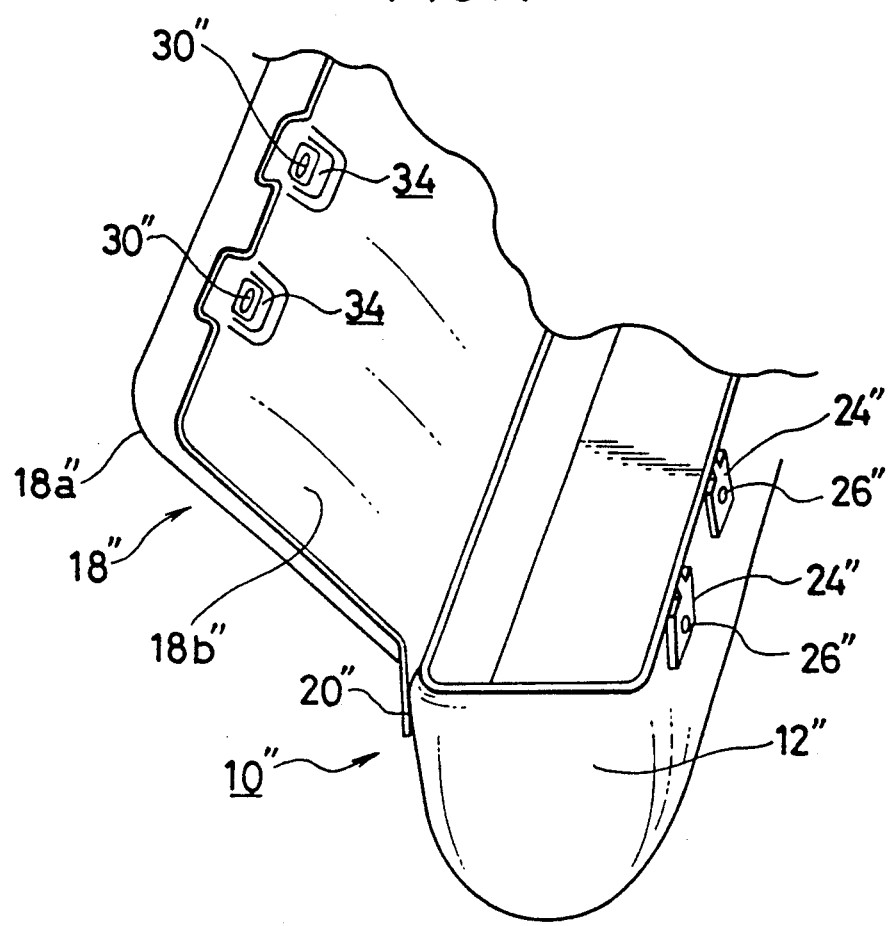
FIG. 7 is a perspective view for explaining the operation of an air bag system having the structure of the embodiment of FIG. 5.
Figure 8:
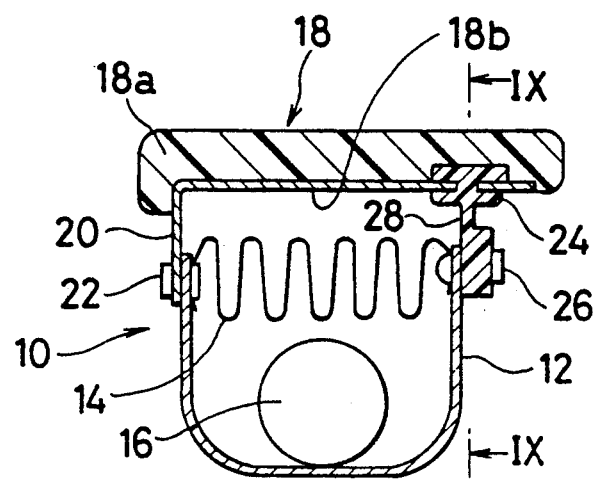
FIG. 8 is a section showing an air bag system having a structure of the prior art.
Figure 9:
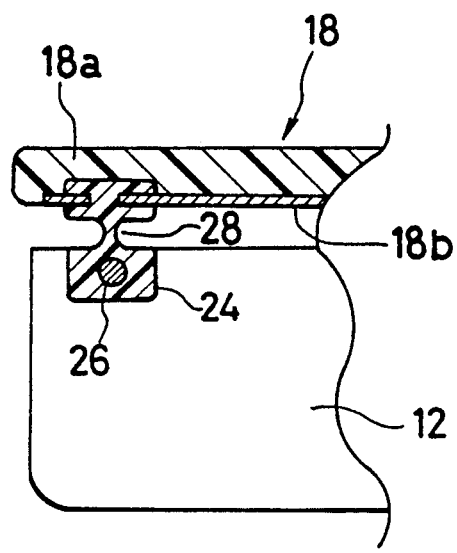
FIG. 9 is a section taken along line IX—IX of FIG. 8.
Figure 10:
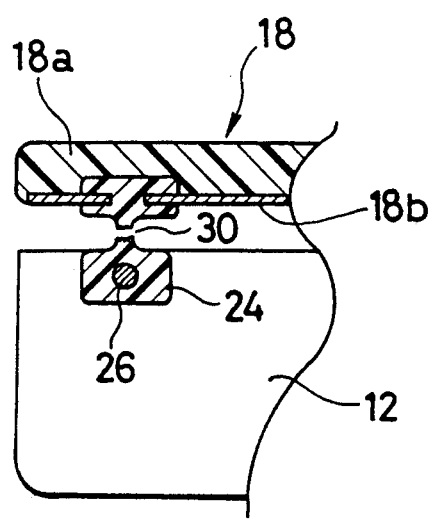
FIG. 10 is a section for explaining the operation of the example of the prior art.
Figure 11:
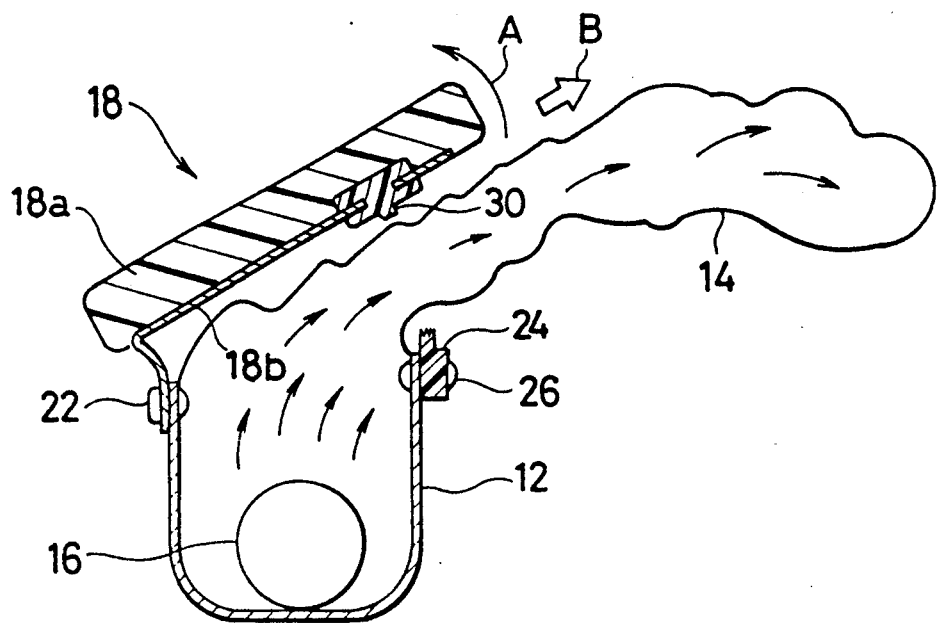
FIG. 11 is a section for explaining the operation of an air bag system having the structure of the prior art.

FIGS. 5 to 7 show a jointing structure according to another embodiment of the present invention. In the present embodiment, a door 18" is formed in its back with a recess 34. The recess 34 has its edge rounded. A joint 24" is so disposed that a neck portion 28" is arranged in the recess 34. The other construction is similar to that of the prior art, and the common portions are designated at double-dashed identical numerals.

In the jointing structure thus constructed, when the air bag system is operated to have the neck portion 28" broken, a residual portion 30" at the door 18" is retracted into the recess 34 (as shown in FIG. 7). As a result, an air bag is kept away from contacting with the portion 30" while being extended into a cabin, so that the air bag is prevented from being damaged.

Figure 1:
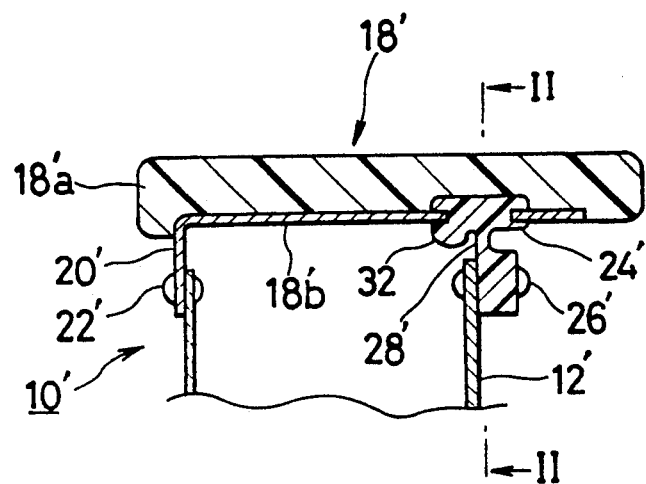
FIG. 1 is a section showing a structure of an embodiment of the present invention.
Figure 2:
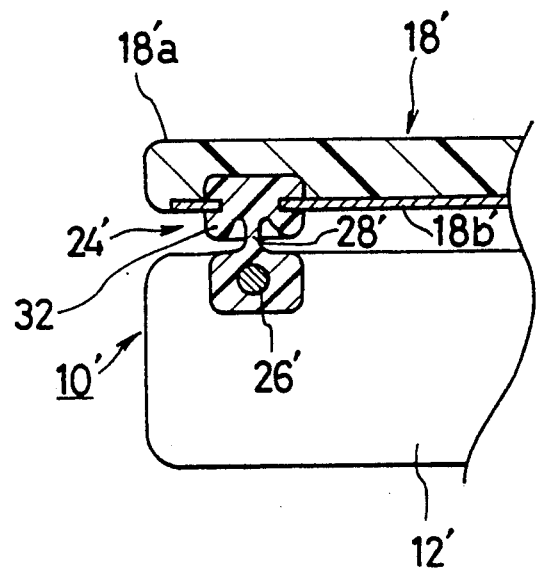
FIG. 2 is a section taken along line II—II of FIG. 1.
Figure 12:
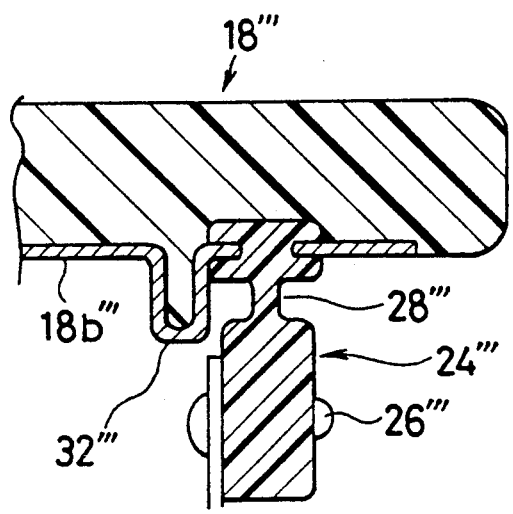
FIG. 12 shows still another embodiment of the present invention.

Although the joint 24' of the embodiment of FIG. 1 is formed with the projection 32, the present invention may be modified such that a back plate 18''', is formed to have a similar projection 32''', as shown in FIG. 12. The other construction of FIG. 12 is similar to that of FIG. 1, and the common portions are designated at triple-dashed identical numerals so as to omit their description.

As described above, according to the jointing structure in the passenger's air bag system of the present invention, the broken face of the jointing member does not contact with the air bag expanding into the cabin when the passenger's air bag system is operated. As a result, the air bag is prevented from being damaged.

Thus, since the air bag is prevented from any damage in accordance with the present invention, the strength required for the material cloth of the air bag can be reduced to drop a prime cost of the air bag.

What is claimed is:

1. An air bag system having a jointing structure between a casing and a door comprising:

a casing having an opening at a front face thereof opened toward a cabin of a vehicle;

a door covering said opening and having opposed sides, one side being connected with said casing near said opening so that the other side of said door can turn out in an opening direction;

a breakable joint for jointing the other side of said door to said casing and capable of being broken to disconnect said casing and said door; and a projection formed on a back of said door near said breakable joint, said projection being located closer to a center of the back of said door than said breakable joint and having a smooth outer face, said projection projecting higher than a portion at which said breakable joint is broken when an air bag is extended.

2. An air bag system according to claim 1, wherein said projection is rounded at a tip portion thereof.

3. An air bag system according to claim 1, wherein said projection and said breakable member are made integrally of an identical material.

4. An air bag system according to claim 1, wherein said projection is made to project directly from said door.

5. An air bag system according to claim 1, wherein a residual portion of a broken joint hides behind said projection when said air bag is extended and said joint is broken so that said air bag is extended into the cabin of the vehicle without any contact with said residual.

6. An air bag system having a jointing structure between a casing and a door, comprising:

a casing having an opening at a front face thereof opened toward a cabin of a vehicle;

a door for covering said opening, said door having an inner surface and opposed sides, one side being connected to said casing near said opening so that the other side of said door can turn out in an opening direction;

a recess formed in the door to dent inwardly from the inner surface of the door; and a breakable joint jointing the other side of said door to said casing, said joint having two base portions fixed to the door and the casing, respectively, and a neck portion situated between the two base portions and capable of being broken thereat, said neck portion being located inside the recess when the joint is connected to the door and the casing so that when the neck portion is broken by opening of the air bag, a broken neck portion is located inside the recess to prevent the air bag from contacting the broken neck portion.

7. An air bag system according to claim 6, wherein said recess has a rounded edge.

8. An air bag system according to claim 6, wherein said neck portion is entirely located inwardly of the inner surface of the door so that when the neck portion is broken, a tip end of the neck portion does not project beyond the inner surface of the door.

9. An air bag system according to claim 8, wherein said inner surface of the door is formed smooth without projection extending toward the opening of the casing to prevent damage of the air bag when expanded.

* * * * *